United States Patent

[11] 3,592,016

| [72] | Inventor | Bernard Ramsay Bligh<br>Norton-on-Tees, England |
|---|---|---|
| [21] | Appl. No. | 655,406 |
| [22] | Filed | July 24, 1967 |
| [45] | Patented | July 13, 1971 |
| [73] | Assignee | Imperial Chemical Industries Limited<br>London, England |
| [32] | Priority | Aug. 4, 1966 |
| [33] | | Great Britain |
| [31] | | 34,979/66 |

[54] XYLENE ISOMER SEPARATION WITH DIRECT CONTACT GASEOUS CARBON DIOXIDE REFRIGERANT
10 Claims, 1 Drawing Fig.

[52] U.S. Cl. .................................................. 62/58,
260/674, 260/707
[51] Int. Cl. ................................................... B01d 9/04
[50] Field of Search ............................................... 62/58;
260/674 A, 707

[56] References Cited
UNITED STATES PATENTS

| 2,659,763 | 11/1953 | Humphreys et al. | 260/707 |
| 3,137,554 | 6/1964 | Gilliland et al. | 62/58 |
| 3,327,492 | 6/1967 | Goard et al. | 62/58 |
| 3,371,035 | 2/1968 | Jacobs et al. | 62/58 |
| 3,177,265 | 4/1965 | Lammers | 260/707 |
| 2,866,833 | 12/1958 | Spiller | 62/58 |

Primary Examiner—Norman Yudkoff
Assistant Examiner—Arthur F. Purcell
Attorney—Cushman, Darby & Cushman ABSTRACT: A process for separating a crystallizable component from a liquid by chilling the liquid comprises dissolving in the liquid from the gas phase at an elevated pressure a substantial amount of a gas which is chemically inert to the liquid, chilling the liquid by evaporating at least part of the gas from the liquid at an initial temperature chosen so that crystals of the crystallizable component are formed thereby and separating at least part of the crystallizable component from the system.

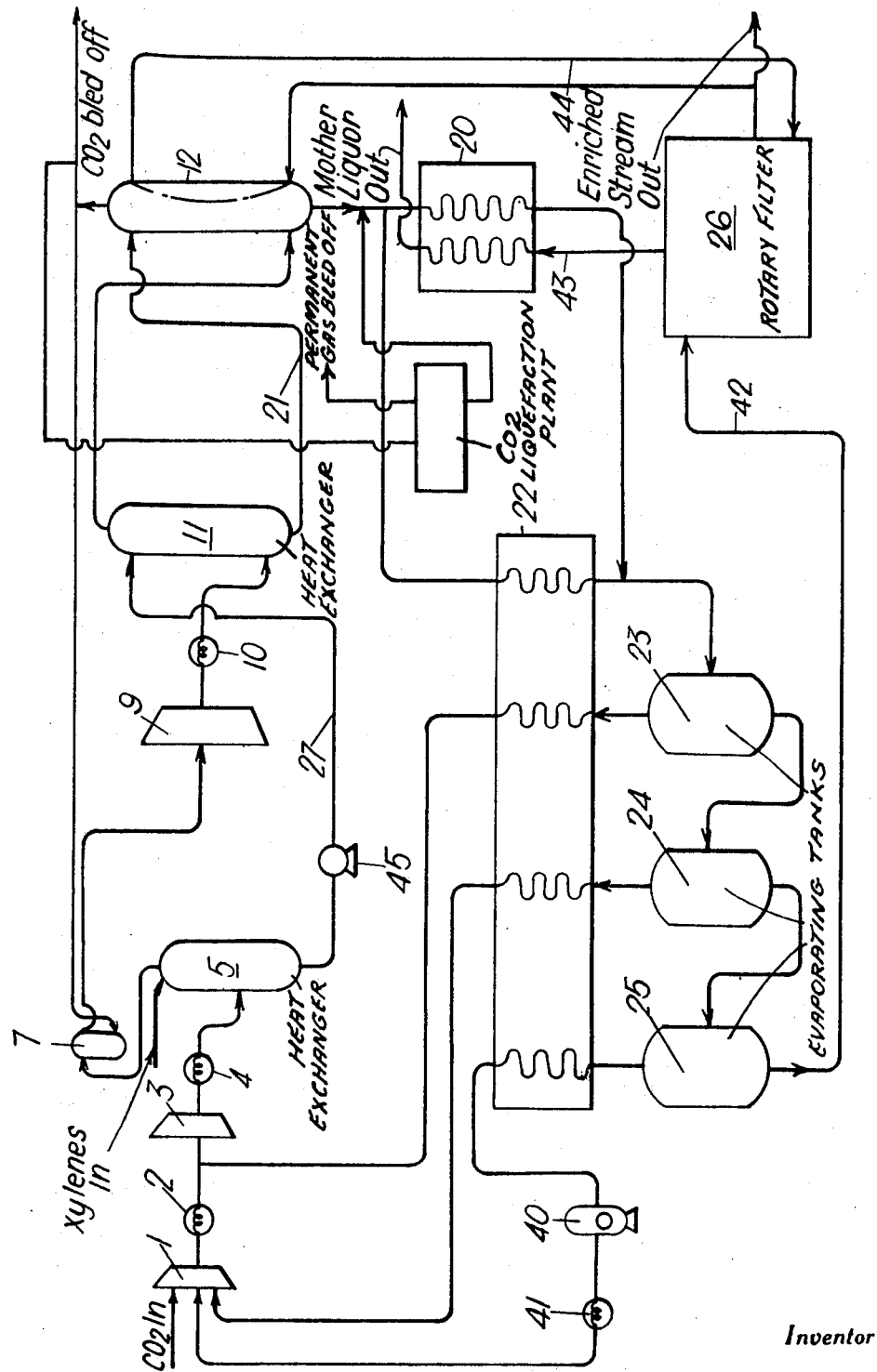

XYLENE ISOMER SEPARATION WITH DIRECT CONTACT GASEOUS CARBON DIOXIDE REFRIGERANT

This invention relates to a separation process.

In the separation of crystallizable components from liquids containing them it has been proposed to cool the liquid to a temperature at which crystallization occurs by contacting the liquid with liquefied carbon dioxide and evaporating the carbon dioxide. This process however suffers from the considerable disadvantage that it is necessary to provide a refrigeration system for producing liquid carbon dioxide at low temperatures. It necessitates also extensive heat insulation of parts of the apparatus which contain liquefied carbon dioxide only.

The present invention provides means whereby these difficulties may be at least partly overcome.

According to the invention a process for separating a crystallizable component from a liquid by chilling the liquid comprises dissolving in the liquid from the gas phase at an elevated pressure a substantial amount of a gas which is chemically inert to the liquid, chilling the liquid by evaporating at least part of the gas from the liquid, at an initial temperature chosen so that crystals of the crystallizable component are formed thereby and separating at least part of the crystallizable component from the system.

The invention is suitable for the treatment of liquids comprising aromatic compounds crystallizable therefrom by chilling, for example, liquids comprising benzene, chlorinated aromatic compounds, or mixtures of para-xylene with at least one isomeric xylene and/or ethylbenzene.

Carbon dioxide is in most cases a very suitable gas for use in the invention. Other gases which may be used are, for example, methane, halogenated hydrocarbon refrigerants (for example methyl chloride), ammonia and sulfur dioxide. The boiling points of the gas and the liquid should be very different, for example differing by 100° to 300° C., so as to minimize any tendency to evaporate the liquid with the gas.

In order to dissolve a substantial amount of gas in the liquid, it is normally dissolved at a temperature not substantially in excess of ambient temperature. Usually when the gas is compressed to an elevated pressure it becomes hot and it is preferably cooled to at most about 45° C. and more preferably at most about 35° C., using any convenient cooler, for example an air or water cooler. It is preferably dissolved in the liquid at a similar or lower temperature in the presence of a large area of surface which is cooled so as to remove the heat of solution of the gas in the liquid.

By way of example, when solutions which contain only relatively minor proportions, for example between 12 percent and 25 percent by weight, of para-xylene, the remainder of the solution consisting essentially of ortho-xylene, meta-xylene and ethyl benzene, are to be treated, after a substantial amount of the gas has been dissolved in them, for example by contacting them with carbon dioxide at a pressure of 10 to 40 and normally 10 to 30 atmospheres and a temperature of 25° C. to 45° C., they are normally chilled to considerably below 0° C., for example to a temperature of −30° C., before the gas is evaporated, as crystallization will normally not occur until below −40° C. The cooling of such solutions to suitable initial temperatures before evaporation of the gas may readily be performed with the aid of one or more heat exchangers which are fed with streams of cold materials derived from later stages in the process.

The gas is normally compressed in several stages to the final pressure at which it is dissolved in the liquid. It is preferred to contact the gas with the liquid at one or more of the intermediate pressures as well as at the final pressure, as by this means part of the gas may be dissolved at the intermediate pressure and it is therefore unnecessary further to compress this part of the gas.

It is preferred that the gas should be removed from the liquid in stages. This permits the pressures at one or more of the stages to be matched with the pressure at one or more of the gas compression stages, thus facilitating the return of gas which is removed at such a stage to the corresponding compression stage, and may in some cases allow crystals of larger size to be produced than is the case with single-stage gas removal. The temperature of the liquid may be reduced at each stage compared with the temperature at the previous stage. Two or three gas evaporation stages are usually employed.

The slurries of crystals with mother liquor produced in this process may be separated for example in rotary filters or centrifuges and may if desired be allowed to settle in a thickener to produce slurries having an increased proportion of solids to mother liquor. It is desirable to separate the crystals from the mother liquor as crystals, although if the gas is removed to a sufficient extent, the slurry may for example be fed into a pulse column separator of conventional type (for example as described by Marwil and Kolner, Chemical Engineering Progress 59, Feb. 1963, page 60) from which the crystallizable component may be recovered as a liquid.

If desired, the process of this invention may be repeated, the crystals first produced being melted and the melt retreated, in order to increase the purity of the final product.

The gas recovered in the evaporation stages is normally recompressed, and redissolved in fresh liquid. However, due to small leakages of permanent gases into the apparatus, it is advantageous to liquefy a proportion of the carbon dioxide which passes round in each cycle, in order to free it from permanent gases before returning it to the apparatus, or to bleed off a proportion of the carbon dioxide at each cycle and replace it by pure carbon dioxide. The former procedure is preferred as being more economical in gas and because it is possible to feed back small variable quantities of carbon dioxide liquid to any critical points in the apparatus in order closely to control the temperature at such points.

One from of the invention will now be described with reference to the accompanying drawing, which is a diagrammatic illustration of apparatus embodying the process of the present invention.

In the drawing, carbon dioxide is fed to a compressor 1 at approximately atmospheric pressure and is raised to a pressure of about 3.5 atmospheres. It is then passed through an air cooler 2 which reduces its temperature to about 35° C. and is fed to a second compressor 3 where the pressure is raised to about 12 atmospheres. From this it passes to an air cooler 4 which again reduces its temperature to 35° C. and is passed through a water-cooled heat exchanger 5 in countercurrent flow to and in contact with a stream of downwardly descending crude xylenes containing about 20 percent by weight of paraxylene. Undissolved carbon dioxide is recovered from the top of the heat exchanger 5, passed through a catch pot 7 to free it from liquid xylenes, and fed to a third compressor 9 in which it is raised to a pressure of 40 atmospheres. It is then again cooled in an air cooler 10 to 35° C. and fed to the base of a water-cooled heat exchanger 11 in countercurrent flow to and in contact with the xylenes stream containing dissolved carbon dioxide derived through line 27 from heat exchanger 5, the temperature of the liquid being held at about 35° C. From the base of heat exchanger 11 the xylenes are passed to the top of the heat exchanger 12 through line 21 and from the top of the heat exchanger 11 the carbon dioxide is fed to the bottom of heat exchanger 12. The temperature of the liquid in heat exchanger 12 is maintained at about 25° C. by cooling it with a stream of concentrated para-xylene at 10° C. derived from melted crystals obtained later in the process. Undissolved carbon dioxide recovered from the top of the heat exchanger 12 is partly recycled to catch pot 7 and partly bled off. From heat exchanger 12 one part of the crude xylenes saturated with carbon dioxide passes to a heat exchanger 20 which is cooled by mother liquor at about −60° C. which is separated from crystals at a later stage in the process. The temperature of the xylenes emerging from this heat exchanger is about −30° C. A further part of the stream of xylenes emerging from heat exchanger 12 is chilled to −30° C. in a heat exchanger 22 fed with carbon dioxide evaporated from the crude xylenes at a later stage in the process. Both streams of xylenes are then reunited and passed to a first evaporator tank 23 which is maintained at a pressure of about 4 atmospheres. Carbon dioxide from this evaporator tank is fed back through heat exchanger 22 to the second stage carbon dioxide compressor 3. The liquid emerging from this evaporator tank is at a temperature of about −55° C. and is passed to a second evaporator tank 24 which is maintained at a pressure of 1.2 atmospheres. The carbon dioxide evolved in this tank is passed through heat exchanger 22 to the first stage of carbon dioxide compressor 1 and the xylenes emerging from this tank have a temperature of −67° C. The xylenes are then fed to a third evaporator tank 25 which is maintained at a pressure of about ⅛ of an atmosphere. Carbon dioxide evolved in this tank is passed through heat exchanger 22, compressed in a vacuum pump 40 to approximately 1 atmosphere, cooled in a water cooler 41 and fed back to the first stage carbon dioxide compressor 1. The liquid emerging from this tank 25 is at a temperature of −69.6° C. and comprises about 12 percent by weight of crystals. It is then fed through line 42 to a rotary filter 26 where the crystals are separated. The mother liquor from the rotary filter is passed through line 43 to the heat exchanger 20 and thence withdrawn from the process. The crystals recovered in the rotary filter 26 are continuously melted by contact with the concentrated para-xylene stream used as coolant in heat exchanger 12 thereby cooling the said stream, part of which is withdrawn as product, the remainder being fed back to heat exchanger 12 to provide a chilling effect therein.

I claim:

1. A process for separating a crystallizable component from a liquid consisting essentially of a mixture of paraxylene and at least one member of the class consisting of ortho-xylene meta-xylene and ethyl benzene by chilling the liquid comprising the steps of:
    a. dissolving in the liquid, from the gas phase at an elevated pressure, a substantial amount of a gas which is chemically inert to the liquid,
    b. chilling the liquid by reducing the pressure to desorb at least part of the gas from the liquid at an initial temperature above the crystallization point of the mixture so that crystals of the crystallizable component are formed thereby, and
    c. separating at least part of the crystallizable component from the system.

2. A process as claimed in claim 1 in which the gas is carbon dioxide.

3. A process as claimed in claim 1 in which the gas is cooled to a maximum temperature of 45° C. after compression to an elevated pressure and is dissolved in the liquid at a similar or lower temperature in the presence of a large area of surface which is cooled so as to remove the heat of solution of the gas.

4. A process as claimed in claim 2 in which a solution containing between 12 and 25 percent by weight of paraxylene the remainder of the solution consisting essentially of ortho-xylene, meta-xylene and ethyl benzene is contacted with carbon dioxide at a pressure of 10 to 30 atmospheres at a temperature of 25° C. to 45° C. to dissolve a substantial amount of gas, the solution is then chilled and the gas is desorbed.

5. A process as claimed in claim 4 in which the solution is cooled after the gas has been dissolved to about −30° C. in a heat exchanger which is fed with a stream of cold material derived from a later stage in the process.

6. A process as claimed in claim 1 in which the gas is compressed in several stages to the final pressure at which it is dissolved in the liquid and in which the gas is contacted with the liquid at one or more of the intermediate pressures as well as at the final pressure.

7. A process as claimed in claim 6 in which the gas is removed from the liquid in stages and the pressure at one or more of the stages is matched with the pressure at one or more of the gas compression stages, gas recovered at the said removal stage being fed to the corresponding gas compression stage.

8. A process as claimed in claim 1 in which the crystals produced in the process are separated in a rotary filter or centrifuge.

9. A process as claimed in claim 1 in which the crystals produced in the process are melted and the melt retreated in a process according to claim 1 to increase the purity of the final product.

10. A process as claimed in claim 2 in which a proportion of the carbon dioxide is liquefied after use, freed from permanent gases and returned to the process.